Patented Oct. 24, 1944

2,360,946

UNITED STATES PATENT OFFICE 2,360,946

REINFORCED RUBBER STRUCTURES

Albert Hershberger, Kenmore, N. Y., assignor to E. I. du Pont de Nemours & Company, Wilmington, Del., a corporation of Delaware No Drawing. Application May 6, 1941,
Serial No. 392,153

18 Claims. (Cl. 154—2)

This invention relates to the treatment of materials to improve the adhesion thereof to natural rubber, compounded rubber, rubber substitutes and the like. More particularly, it relates to methods for obtaining improved adhesion between rubber and cellulosic threads, filaments, cords, fabrics, and the like, and the products resulting from such methods. This invention is especially applicable to artificial threads as will be explained more in detail below.

In the past it has been found that artificial threads such as regenerated cellulose threads, filaments, cords, or the like adhere very poorly to compounded rubber stock when the two are united and the rubber stock subsequently cured according to any of the known processes which produce commercially satisfactory adhesion between rubber and cotton. This poor adhesion of artificial threads to rubber has constituted a continuous problem to their use in place of cotton in the manufacture of automobile tires, reinforced rubber belts and similar products consisting of alternate plies of rubber and cord which are required to adhere very strongly for long periods of time under drastic conditions of high temperature, constant flexing and bending, shock, etc. Artificial threads are preferable to cotton in such uses because of their higher tensile strength, especially at elevated temperatures and because of their continuous filament structure. If rayon cord, for example, is pressed into commercial rubber stock such as is customarily used in the manufacture of tires or belting and the whole is cured at high pressure and at an elevated temperature sufficient to completely vulcanize the rubber stock, it will be observed that the rayon cord can be pulled away from the rubber with comparative facility. Indeed, if subjected to a standard pull-out test which measures the force required to separate the cord from the rubber, rayon cord is found to adhere to rubber only approximately half as well as a similar cotton cord submitted to the same test.

It is an object of this invention to provide a method of securing improved adhesion between a solid structure and rubber.

It is another object of this invention to provide a method for securing improved adhesion between rayon or other filamentous forms of regenerated cellulose and rubber.

A more specific object of this invention is to provide a method for securing improved adhesion between filaments or threads of cellulosic material and rubber by means of certain chemical compounds applied to the said filaments, threads, or the like.

A still further object of this invention is to produce artificial threads such as regenerated cellulose, to which rubber may be more firmly adhered by reason of the presence on and/or in the artificial threads of certain chemical compounds with or without dispersed rubber or latex.

Other objects will appear from the following description.

The objects of the invention are accomplished, in general, by applying to a solid structure, for example, cellulosic threads, cords, filaments or the like, a treating composition containing a non-resinous, non-polymeric reaction product of a tannin and an amine, and, if desired, also dispersed rubber or latex, whereby to improve the adhesion between the solid structure and rubber after their combination and vulcanization of the rubber.

In order to set forth more clearly and concisely the principles of the invention, it will be described with particular reference to rayon made by the viscose process and having a dry tensile strength at room temperature, i. e., 75° F. of two grams or more per denier and preferably 2.5 grams or more per denier in the form of heavy cord. It is to be understood however that any rubber-reinforcing filament, thread, or cord, such as one comprising cellulose, cellulose derivatives, synthetic linear polymers, vinyl polymers, for example, vinyl chloride-vinyl acetate polymers may be adhered to rubber in accordance with the present invention. The invention is particularly applicable to filaments, threads or cords produced by a wet spinning process, i. e., by coagulation from an aqueous cellulosic dispersion in an aqueous coagulating bath. Thus, the invention includes the treatment of regenerated cellulose made by the cuprammonium or viscose process, lowly esterified cellulose esters such as lowly acetylated cellulose acetate, or lowly etherified cellulose ethers such as lowly etherified glycol cellulose, lowly etherified methyl cellulose, lowly etherified ethyl cellulose, cellulose glycolic acid and the like.

The invention includes cords and fabrics of any type or construction made from such cellulosic threads or filaments. The invention also contemplates the use of thermoplastic cellulose derivatives such as cellulose triacetate. When such thermoplastic materials are used, the temperature to which the material is subjected in the various steps of the process and the temperature at which the final product is used must be kept well below the softening point of the cellulose derivatives. Furthermore, the materials with which the derivative is treated must be so chosen that the steps of the process can be carried out at a temperature below the softening point of the cellulose derivative.

The preferred cellulosic material used in this invention is in the form of strong viscose rayon thread having a dry tensile strength at room temperature of above 2.0 grams per denier, prepared in the manner taught by H. H. Parker in U. S. Patent No. 2,133,714 or in the form of twisted structures such as strands or cords plied to said strong rayon thread.

As the rubber to which said cellulosic thread structures will adhere the invention contemplates any compounded natural rubber stock or any compounded synthetic rubber stock such as polymerized isoprene or polymerized butadiene, or rubber substitutes such as halogenated substituted butadiene, such as halogen-2-butadiene-1,3 polymer, e. g. chloro-2-butadiene-1,3 polymer, and other types. Moreover, the rubber may contain any desired vulcanizers, stabilizers, accelerators, etc., singly or in any desired combination. In its preferred and common form, the invention contemplates any commercial compounded rubber stock such as is commonly employed in the fabrication of automobile tires, hose, raincoat materials, shoes, belting such as conveyor belts, fan belts or other driving belts or the like.

The term "rubber," unless otherwise modified, as used in the specification and claims, is intended to be used in its generic sense to include rubber substitutes, natural rubber, compounded rubber, synthetic rubber, and the like.

As chemical compounds to be applied to cellulosic yarns, cords, filaments and like structures to improve their adhesion to rubber, this invention contemplates non-resinous, non-polymeric reaction products of tannins and amines.

As tannins, the following may be mentioned: gallic acid, tannic acid, ammonium salts of gallic and tannic acids, and aliphatic and aromatic esters of gallic and tannic acids, such as esters formed by reacting these acids with polyhydric alcohols, for example, glycol, glycerol and diethylene glycol or the like. Especially suitable for the present purpose are naturally occurring tannins, such as tannins extracted from the bark of the quebracho tree, known as quebracho extract. It is to be understood that the tannins may be used either singly or in any combination and also that this invention is not limited to any specific tannin.

As amines, all primary, secondary and tertiary amines are operable and included within the scope of the present invention. The following amines have been found to be particularly suitable: diethylene triamine, hexamethylene diamine, 2-amino 5-hydroxy toluene, aniline, dibenzyl amine, diethyl amino phenol, p-amino phenol, and piperidine. The tannins and amines may be reacted with each other prior to application to the yarn, or they may be applied to the yarn separately, in either order. Furthermore, they may be applied as the pure liquid, or from aqueous or other solutions. In most cases, precipitates from any tannic acid solutions are treated with amines or their solutions. The precipitates are soluble in ammonium hydroxide or the precipitations may be avoided by treating the tannic acid solution with ammonium hydroxide to form ammonium tannate.

The tannins are generally applicable from aqueous solutions. These aqueous solutions should have a concentration of between 1% and 25% and preferably between 2% and 20%. The amines may be applied in pure form, that is, 100% amine, if they are in liquid form. Alternatively, they may be applied from organic solvent solutions, or aqueous solutions if they are water-soluble. The amines may also be applied in vapor form. For water-soluble amines, the preferred concentration is between 2% and 25%.

After application of the tannin-amine composition, or the tannin and the amine compositions, the yarn or cord is dried in any suitable manner. The drying may be conducted at room temperature or at elevated temperatures as desired. The cords may, for example, be passed over heated drier rolls, or they may be passed through a drying chamber in which hot air is circulated. After drying, the cord or yarn is ready for incorporation in rubber structures as reinforcing elements therefor. While the treatment of cellulosic tire reinforcing cords and yarns with tannin-amine reaction products improves the adhesion of the cord to rubber, it is preferred according to this invention to treat the cords with a tannin-amine reaction product and also with dispersed rubber or rubber latex. This may be accomplished in a number of ways, the simplest and most convenient of which contemplates the combination of an aqueous dispersion of rubber or rubber latex with an aqueous solution or dispersion of a tannin and an amine before application to the cord. The latex or rubber may be present in the solution for treating the cord in any desired proportion, although the improvement in adhesion is most marked when concentrations of rubber or latex solids are used which comprise between 5% and 40% by weight of the treating composition, and preferably between 10% and 25% by weight of the treating solution. If a natural latex dispersion is used, it may be either crude latex, a creamed latex, that is to say, a latex from which certain soluble materials such as sugar, acid, soluble resins, soluble proteins, etc. have been removed or one which contains added materials, or one which has been treated to change the character of the rubber in it, for instance by degradation or oxidation or both. Furthermore, latex or dispersed rubber may contain any desired accelerators, vulcanizers, stabilizers, dispersing agents, or any other substances which are commonly employed in the rubber industry. When rubber is used as an artificial dispersion in water, of either natural rubber or of any known synthetic rubber, it may likewise contain additionally such substances as accelerators, vulcanizers, stabilizers, dispersing agents and the like.

The type or kind of rubber dispersion or rubber latex to be used depends to some extent upon the type or kind of rubber stock to which it is desired to bond the treated rayon. For example, to obtain good adhesion between treated rayon and a rubber substitute composed of chloro-2-butadiene-1,3 polymer, it is preferable to treat the rayon with an aqueous solution of a tannin and an amide, or a tannin-amine reaction product in combination with chloro-2-butadiene-1,3 polymer latex. The thread treating composition may also contain other materials such as casein, glutinous materials, water-soluble adhesives, wetting agents, and the like, which may be added as adhesives, stabilizers, or for a variety of purposes without departing from the fundamental principles of this invention.

Variations in the procedure for preparing an aqueous solution containing a tannin-amine reaction product, or a tannin and an amine, and dispersed rubber or rubber latex may be employed depending upon the concentration of tannin-amine and rubber solids desired in the finished composition. The simplest and most convenient method consists in dissolving a tannin and an amine, or tannin-amine reaction product, in water and stirring this solution into an aqueous dispersion of rubber or rubber latex.

Instead of applying dispersed rubber or rubber latex to the cord together with the tannin and amine in a single step from an aqueous solution containing all of these materials, this invention also contemplates, as a method for improving the adhesion of cellulosic cord to rubber, the steps of treating the cord with a solution of a tannin and an amine or a tannin-amine reaction product, subsequently drying the cord, and then treating the resulting tannin-amine coated cord with a solution of rubber in toluene or other suitable rubber solvent, drying the so-treated cord to evaporate the solvent so that the cord has a coating of tannin-amine and on that a coating of rubber. The rubber solution used may be a solution of either natural or synthetic rubber or of a rubber substitute and may be either raw rubber or rubber compounded with any of the usual accelerators, vulcanizers, stabilizers and the like which are commonly added to rubber or of rubber degraded, oxidized or otherwise modified.

Other methods of applying to a cellulosic rubber reinforcing cord a tannin-amine reaction product and rubber or rubber latex to improve the adhesion of the cord to rubber are also possible in accordance with this invention. For example, the cord may be treated first with a solution of a tannin and an amine, or a tannin-amine reaction product, and dried at a suitable temperature. The cord is then treated with a solution containing a tannin and an amine, or a tannin-amine reaction product, and containing also dispersed rubber or rubber latex. Alternatively, the rayon cord may be given two treatments. The first with a solution of a tannin and an amine, or a tannin-amine reaction product, and dispersed rubber or rubber latex, and then with a second solution also containing the same ingredients; however, containing a different ratio of tannin-amine to dispersed rubber or rubber latex. It is understood that after each treatment, the cord is dried before the application of the next successive treatment.

The application to the yarn or cord of a composition containing a tannin, an amine, a tannin-amine reaction product, a dispersion of rubber or rubber latex or any combination thereof, may be accomplished in a number of ways. For example, cellulosic rubber reinforcing cord, yarn or fabric may be passed through the desired composition contained in a tank, then between doctor knives or squeeze rolls to remove excess composition therefrom and thence over a series of drier rolls maintained at a temperature sufficiently high to dry out the cord or fabric. Other equally suitable means for applying the desired composition may be employed, such as by means of transfer rolls, by spraying, by brushing or the like. Likewise, drying of the treated cord, yarn or fabric may be accomplished in other ways, for example, by means of a belt or frame carrying the treated rayon cord or fabric through a heated enclosed chamber, or by means of a tunnel drier provided with hot air circulation.

If the cellulosic rubber reinforcing yarn or cord treated and dried as above described is placed upon a commercial compounded rubber stock, such as is customarily used in the manufacture of tires and the whole is cured at high pressure and elevated temperature sufficient to vulcanize the rubber stock completely, the treated cord is found to strongly adhere to the rubber. If the cord, so vulcanized, is subjected to a standard pull-out test which measures the force required to separate the cord from the rubber and, therefore, constitutes a measure of the adhesion between the cord and rubber, it is found that the adhesion between the cord and rubber is at least equal to and often greater than that obtained between cotton and rubber, and may be two or even more times better than the adhesion between untreated cellulosic cord and rubber.

If the treated rayon cord is subjected to a standard pull-out test at an elevated temperature, for example at 270° F., to measure the adhesion between the cord and rubber at this temperature, the adhesion is found to be equal to and often better than the adhesion of cotton cord to rubber at this temperature, a fact which is of utmost importance in the construction of tires, fan belts and similar articles which develop a high temperature under ordinary conditions of usage. This constitutes a great advantage in the above-described treatment over a number of other adhesion treatments which, when applied to rayon, result in a treated cord with good adhesion to rubber at room temperature, but with poor adhesion to rubber at an elevated temperature.

In addition to improving the adhesion of rayon to rubber by treating the rayon with an aqueous solution of a tannin, an amine and a suitable catalyst and containing dispersed rubber or rubber latex as hereinbefore described, this treatment greatly increases the length of time a pad consisting of plies of so-treated cords or fabrics to which a skim coat of compounded rubber stock has been applied, and the whole subjected to sufficient temperature and pressure to completely vulcanize the rubber may be flexed and bent under tension before separation of the plies takes place. For example, when such a pad prepared from untreated rayon may be flexed 2000 times and a similar pad prepared from cotton may be flexed 17,000 times before separation of the plies takes place, a similar pad prepared from rayon according to the teaching of this invention may be flexed 100,000 times before separation of the plies takes place, a fact which is of utmost importance in the construction of tires.

Furthermore, rayon cord treated according to this invention, in order to improve its adhesion to rubber, undergoes no marked decrease in fatigue resistance. Fatigue resistance of a tire cord is measured in a variety of ways, in one of which the cord is subjected for a fixed number of flexings to drastic conditions of flexing and simultaneous stretching at an elevated temperature which conditions approximate those encountered during the actual use of tires. The tensile strength of the cord after the prescribed flexing and stretching compared with the tensile strength before the test gives a measure of the fatigue resistance of the cord. For rayon cord treated according to this invention the drop in tensile strength after the fatigue resistance test is very slight, whereas cotton cord loses its tensile strength entirely when subjected to the same test. This improved resistance to fatigue at elevated temperatures exhibited by rayon cord treated according to this invention is a great advantage in cord designed for use in tires, fan belts and the like which develop a high temperature under ordinary conditions of usage and at the same time undergo constant and severe flexing, bending and stretching.

In order to more clearly illustrate this invention, the following examples are given. It is, of course, to be understood that the invention is not to be limited to the precise details set forth in the examples. Reference is made in the examples to the adhesion values of the treated yarn to rubber. These values are the results of actual tests which were conducted in the following manner: The cord was first treated with a solution of the desired treating agent and dried. The treated cord was then laid on the surface of a skim coat of unvulcanized rubber calendered on to a cotton backing. The rubber and cord were then placed in a press and vulcanized at a temperature and pressure necessary to completely vulcanize the rubber. Shims were used which would allow the overflow of a very small amount of rubber during the vulcanization. During vulcanization, the cords became embedded in the surface of the rubber. The adhesion of the cords to the rubber was measured individually on a Scott tension testing machine. In this test, the cord was peeled from the rubber stock at a uniform rate and the adhesion read in terms of grams required to cause this separation.

To give a direct comparison with untreated cotton cord, the adhesion of cotton cord to rubber has been assigned the adhesion value of 150. The adhesion values contained in the examples have been interpolated to give a direct comparison with untreated cotton cord.

*Example I*

An 1100-denier regenerated cellulose rubber tire reinforcing yarn was first treated in a 5% aqueous solution of tannic acid. The bath was placed in a shallow tank of convenient length and width and the yarn conducted through the bath by means of suitable guides or pulleys. The yarn was then led into a drying tower maintained at 140° C. and provided with air circulation. The excess bath was permitted to drain back into the dipping tank since the yarn came in contact with no support until it had traveled through the entire length of the drying chamber, a distance of approximately 5 feet, during which travel the yarn was at least partially dried. Additional passes through the tower were made by passing the yarn over suitable roller guides. The yarn was drawn through the tower mechanically at a speed of 15 feet per minute and wound on a bobbin. The yarn so treated with tannic acid was then subjected to treatment in a bath composed entirely of diethyl amino phenol and again passed through the drying tower in the same manner as the procedure following the tannic acid treatment.

The above treatment increased the weight of the yarn 20% over that of the untreated dry yarn and said treated yarn was found to have an adhesion value of 180.

*Example II*

An 1100-denier regenerated cellulose rubber tire reinforcing yarn was treated in the same manner as described in Example I in a water solution containing 10% tannic acid, 10% diethyl amino phenol and 0.55% ammonia (as 28% ammonium hydroxide). As a result of this treatment, the yarn increased in weight 25% and had an adhesion value of 225.

*Example III*

An aqueous solution containing the following materials was prepared:

| | Per cent |
|---|---|
| Tannic acid | 10 |
| Dimethyl amino phenol | 5 |
| Ammonia (as 28% ammonium hydroxide) | 1.1 |
| Ammonium oleate | 0.25 |

In preparing the solution, ammonium hydroxide was added to the 10% tannic acid solution to form soluble ammonium tannate. To this, the amine was added without precipitation. Ammonium oleate was then added as a softening agent.

An 1100-denier regenerated cellulose rubber tire reinforcing yarn was treated with the above solution in a manner similar to that described in Example I. The yarn increased in weight because of this treatment approximately 25% and was found to have an adhesion value of 195.

*Example IV*

A regenerated cellulose rubber tire cord was treated in the manner described in Example I in an aqueous solution containing 10% tannic acid, 2.5 ethyl methyl amino phenol, 1.1% ammonia (as 28% ammonium hydroxide) and 5% rubber latex. The cord so treated increased in weight 30% and had an adhesion value of 180.

*Example V*

A regenerated cellulose rubber tire cord was treated in an aqueous solution containing 15% tannic acid, 2.5% di-octyl amino phenol, 1.1% ammonia (as 28% ammonium hydroxide) and 0.5% sodium hydroxide. The yarn increased in weight 30% and showed an adhesion value of 195.

*Example VI*

A regenerated cellulose rubber tire reinforcing yarn was first treated in a 5% aqueous solution of tannic acid, followed by a treatment in a 2.5% solution of tetra-ethylene pentamine. The yarn increased in weight 20% and had an adhesion value of 155.

*Example VII*

A regenerated cellulose rubber tire cord was first treated in a 5% tannic acid solution according to the process described in Example I, followed by treatment in a solution containing 2.5% p-amino phenol. The yarn increased in weight 20% and showed an adhesion value of 155.

The present invention has been described with particular reference to the adhesion of cellulosic materials, particularly regenerated cellulose materials to rubber. The present invention is not to be limited to the adhesion of cellulosic materials to rubber. In its broad scope the non-resinous, non-polymeric tannin-amine reaction products, with or without dispersed rubber or rubber latex, include improvement in adhesion to rubber of cotton, wood, metal, glass and all synthetic plastic materials. In obtaining the improved adherence between rubber and other solid structures, it is only necessary to apply the non-resinous, non-polymeric tanninamine reaction product to the solid structures, placing the so-treated structure in contact with vulcanizable rubber, and vulcanizing said rubber.

Since it is obvious that many changes and modifications of the invention can be made within the nature and spirit thereof, it is to be understood that the invention is not to be limited to the details described herein except as set forth in the appended claims.

I claim:

1. The process of forming an improved adhesion between a solid structure and rubber which comprises interposing, between said structure and vulcanizable rubber, a non-resinous, non-polymeric tannin-amine reaction product, and vulcanizing said vulcanizable rubber.

2. The process of forming an improved adhesion between a solid structure and rubber which comprises interposing, between said structure and vulcanizable rubber, a non-resinous, non-polymeric tannin-amine reaction product and a dispersed rubber, and vulcanizing said vulcanizable rubber.

3. The process of forming an improved adhesion between a solid structure and rubber which comprises applying to said structure a non-resinous, non-polymeric tannin-amine reaction product, positioning said structure in contact with vulcanizable rubber, and vulcanizing said vulcanizable rubber.

4. The process of forming an improved adhesion between a solid structure and rubber which comprises applying to said structure a tannin and an amine whereby to form on said structure a non-resinous, non-polymeric tannin-amine reaction product, positioning said structure in contact with vulcanizable rubber, and vulcanizing said vulcanizable rubber.

5. The process of forming an improved adhesion between a rubber-reinforcing cord and rubber which comprises interposing, between said cord and vulcanizable rubber, a non-resinous, non-polymeric tannin-amine reaction product, and vulcanizing said vulcanizable rubber.

6. The process of forming an improved adhesion between a rubber-reinforcing cord and rubber which comprises interposing, between said cord and vulcanizable rubber, a non-resinous, non-polymeric tannin-amine reaction product and a dispersed rubber, and vulcanizing said vulcanizable rubber.

7. The process of forming an improved adhesion between a rubber-reinforcing cord and rubber which comprises applying to said cord a non-resinous, non-polymeric tannin-amine reaction product, positioning said cord in contact with vulcanizable rubber, and vulcanizing said vulcanizable rubber.

8. The process of forming an improved adhesion between a rubber-reinforcing cord and rubber which comprises applying to said cord a tannin and an amine whereby to form on said cord structure a non-resinous, non-polymeric tannin-amine reaction product, positioning said cord in contact with vulcanizable rubber, and vulcanizing said vulcanizable rubber.

9. The process of forming an improved adhesion between a rubber-reinforcing cord and rubber which comprises interposing, between said cord and vulcanizable rubber, between 5% and 50% (based on the dry weight of the cord) of a non-resinous, non-polymeric tannin-amine reaction product, and vulcanizing said vulcanizable rubber.

10. The process of forming an improved adhesion between a rubber-reinforcing cord and rubber which comprises interposing, between said cord and vulcanizable rubber, between 5% and 50% (based on the dry weight of the cord) of a non-resinous, non-polymeric tannin-amine reaction product and a dispersed rubber, and vulcanizing said vulcanizable rubber.

11. The process of forming an improved adhesion between a rubber-reinforcing cord and rubber which comprises applying to said cord between 5% and 50% (based on the dry weight of the cord) of a non-resinous, non-polymeric tannin-amine reaction product, positioning said cord in contact with the vulcanizable rubber, and vulcanizing said vulcanizable rubber.

12. The process of forming an improved adhesion between a rubber-reinforcing cord and rubber which comprises applying to said cord a sufficient quantity of a tannin and an amine to form on said cord between 5% and 50% (based on the dry weight of the cord) of a non-resinous, non-polymeric tannin-amine reaction product, positioning said cord in contact with vulcanizable rubber, and vulcanizing said vulcanizable rubber.

13. As a new article of manufacture a solid structure joined to vulcanized rubber, said vulcanized rubber adhered to said solid structure by means of a composition comprising, as an essential bonding agent, a non-resinous, non-polymeric tannin-amine reaction product.

14. As a new article of manufacture a solid structure joined to vulcanized rubber, said vulcanized rubber adhered to said solid structure by means of a composition comprising, as essential bonding agents, a non-resinous, non-polymeric tannin-amine reaction product and rubber.

15. As a new article of manufacture a rubber-reinforcing cord joined to vulcanized rubber, said vulcanized rubber adhered to said cord by means of a composition comprising, as an essential bonding agent, a non-resinous, non-polymeric tannin-amine reaction product.

16. As a new article of manufacture a rubber-reinforcing cord joined to vulcanized rubber, said vulcanized rubber adhered to said cord by means of a composition comprising, as essential bonding agents, a non-resinous, non-polymeric tannin-amine reaction product and rubber.

17. As a new article of manufacture a rubber-reinforcing cord joined to vulcanized rubber, said vulcanized rubber adhered to said cord by means of a composition comprising, as an essential bonding agent, a non-resinous, non-polymeric tannin-amine reaction product, said composition being present in an amount of 5% to 50% of the dry weight of the cord.

18. As a new article of manufacture a rubber-reinforcing cord joined to vulcanized rubber, said vulcanized rubber adhered to said cord by means of a composition comprising, as essential bonding agents, a non-resinous, non-polymeric tannin-amine reaction product and rubber, said composition being present in an amount of 5% to 50% of the dry weight of the cord.

ALBERT HERSHBERGER.

CERTIFICATE OF CORRECTION.

Patent No. 2,360,946. October 24, 1944.

ALBERT HERSHBERGER.

It is hereby certified that error appears in the printed specification of the above numbered patent requiring correction as follows: Page 2, second column, line 60, for "amide" read --amine--; page 3, first column, line 32, for "tretaed" read --treated--; and that the said Letters Patent should be read with this correction therein that the same may conform to the record of the case in the Patent Office.

Signed and sealed this 16th day of January, A. D. 1945.

Leslie Frazer (Seal)                  Acting Commissioner of Patents.